US008694031B2

(12) United States Patent
Lew et al.

(10) Patent No.: US 8,694,031 B2
(45) Date of Patent: Apr. 8, 2014

(54) SMS TECHNOLOGY FOR COMPUTERIZED DEVICES

(75) Inventors: Eugene Lee Lew, Olney, MD (US); Nimrod Gal-Oz, Lehavim (IL)

(73) Assignee: Media Friends, Inc., Cambridge, MA (US)

( * ) Notice: Subject to any disclaimer, the term of this patent is extended or adjusted under 35 U.S.C. 154(b) by 637 days.

(21) Appl. No.: 12/535,323

(22) Filed: Aug. 4, 2009

(65) Prior Publication Data
US 2010/0035640 A1 Feb. 11, 2010

Related U.S. Application Data

(60) Provisional application No. 61/137,918, filed on Aug. 5, 2008, provisional application No. 61/164,705, filed on Mar. 30, 2009.

(51) Int. Cl.
*H04W 4/00* (2009.01)
(52) U.S. Cl.
USPC .......................................... 455/466; 709/206
(58) Field of Classification Search
USPC ........ 455/466, 445, 451, 435.1, 414.1, 426.1, 455/462; 370/395.52, 328, 432, 312; 709/206
See application file for complete search history.

(56) References Cited

U.S. PATENT DOCUMENTS

| 6,757,365 | B1 | 6/2004 | Bogard |
| 7,010,312 | B1 | 3/2006 | Zechlin |
| 7,197,035 | B2 | 3/2007 | Asano |
| 7,263,076 | B1* | 8/2007 | Leibovitz et al. ............. 370/310 |
| 7,275,104 | B1 | 9/2007 | Martinez et al. |
| 7,343,168 | B2 | 3/2008 | Valloppillil |
| 7,380,022 | B2 | 5/2008 | Tell et al. |
| 7,446,655 | B2 | 11/2008 | Jha et al. |
| 7,499,704 | B1* | 3/2009 | Bonner ...................... 455/435.1 |
| 7,564,958 | B1* | 7/2009 | Contractor ................. 379/93.15 |
| 7,606,568 | B2* | 10/2009 | Gallagher et al. ............ 455/436 |
| 7,693,535 | B2* | 4/2010 | Dunko .......................... 455/518 |
| 7,734,908 | B1* | 6/2010 | Kung et al. .................... 713/153 |
| 7,860,525 | B2* | 12/2010 | Parkkinen et al. ........... 455/518 |
| 7,865,198 | B2* | 1/2011 | Shin .............................. 455/466 |
| 7,940,896 | B2* | 5/2011 | Prozeniuk et al. ............. 379/45 |
| 8,463,304 | B2 | 6/2013 | Lauer et al. |

(Continued)

FOREIGN PATENT DOCUMENTS

GB 2431820 A 5/2007
WO WO 2007/015075 A1 2/2007

OTHER PUBLICATIONS

ISR for PCT/US09/052715, Sep. 24, 2009, MediaFriends, Inc.

(Continued)

*Primary Examiner* — Michael Faragalla
*Assistant Examiner* — Gerald Oliver
(74) *Attorney, Agent, or Firm* — Chapin IP Law, LLC

(57) ABSTRACT

A method and system for delivering SMS and MMS messages from a mobile telephone to devices having addresses on an Internet Protocol network are provided. In an embodiment of the invention a device having an IP address and a Media Access Control (MAC) address is registered on a network router and a telephone number is associated with the registered device on the router, such that when the router receives an SMS or MMS message for the telephone number associated with the device the router retrieves the IP address for the device and routes the message to the device.

24 Claims, 4 Drawing Sheets

(56) References Cited

U.S. PATENT DOCUMENTS

| | | | |
|---|---|---|---|
| 2003/0101244 A1* | 5/2003 | Lockridge et al. | 709/220 |
| 2004/0076144 A1 | 4/2004 | Ishodoshiro | |
| 2004/0109452 A1* | 6/2004 | Takihiro et al. | 370/392 |
| 2005/0148353 A1* | 7/2005 | Hicks et al. | 455/466 |
| 2005/0288045 A1* | 12/2005 | Yang et al. | 455/466 |
| 2006/0040610 A1 | 2/2006 | Kangas | |
| 2006/0142012 A1* | 6/2006 | Kirchhoff et al. | 455/445 |
| 2006/0148495 A1* | 7/2006 | Wilson | 455/466 |
| 2007/0066318 A1* | 3/2007 | Danzeisen et al. | 455/450 |
| 2007/0190978 A1 | 8/2007 | White et al. | |
| 2008/0043969 A1 | 2/2008 | Shi | |
| 2008/0182563 A1 | 7/2008 | Wugofski et al. | |
| 2008/0293404 A1* | 11/2008 | Scherzer et al. | 455/426.1 |
| 2009/0005005 A1* | 1/2009 | Forstall et al. | 455/411 |
| 2009/0031232 A1 | 1/2009 | Brezina et al. | |
| 2009/0154434 A1* | 6/2009 | Tanaka et al. | 370/338 |
| 2009/0156202 A1* | 6/2009 | Reiss et al. | 455/426.1 |
| 2009/0186634 A1* | 7/2009 | Sureka et al. | 455/466 |

OTHER PUBLICATIONS

International Search Report and Written Opinion mailed Dec. 7, 2011 in corresponding International Application No. PCT/US2011/037190.

European Search Report for corresponding European application No. 09805443.0, mailed Dec. 11, 2013, total pp. 8.

* cited by examiner

SMS TECHNOLOGY FOR COMPUTERIZED DEVICES

RELATED APPLICATIONS

This application claims the benefit of U.S. provisional patent application Ser. Nos. 61/137,918, entitled "Apparatus and methods for TV social applications", fled Aug. 5, 2008, 61/164,705, entitled "SMS Technology for Computerized Devices", filed Mar. 30, 2009, and U.S. patent application Ser. No. 12/534,939, and PCT application number PCT/US09/52646, entitled "Apparatus and methods for TV social applications", filed Aug. 4, 2009, the entire contents of which are incorporated herein in their entireties.

TECHNICAL FIELD

The present invention relates to methods and systems for delivering messages from mobile telephones to non-telephonic devices on an Internet Protocol (IP) network.

BACKGROUND OF THE INVENTION

Text messaging is a commercial success for the mobile telephone industry. Cellular telephone customers contract with their cellular provider to send and receive text messages on their cellular telephones. Common communications protocols for text messages are Short Message Service (SMS) and Multimedia Message Service (MMS). The SMS standard was defined as part of the GSM series of standards in 1985 to allow users to send messages of up to 160 characters to and from GSM Mobile handsets. The SMS protocol has been expanded to other mobile handset protocols and is currently used by several billion people worldwide. A common protocol for exchanging SMS messages between SMS peer entities is Short Message Peer-to-Peer (SMPP).

In text messaging, a first mobile telephone user uses the keypad on a mobile telephone to enter a text message, enters a telephone number of a second mobile telephone user to receive the message and then sends the message. The second user can, if the second user's phone is text enabled, read the message on the mobile telephone display and choose to reply by entering a text message and sending the reply to the first user. Text messages are frequently typed in abbreviated language such as "r u" for "are you" and have the advantage over voice based communication that a text message can be read and replied to quietly and at the convenience of the recipient so that the pace of a text message exchange naturally adjusts to the circumstances of both participants. For example, an attorney in a court room can receive a text message with important information concerning the case he is trying while in the courtroom, continue to try the case, and reply to the text message with a further question at that time or later during a recess in the case. Because sending and receiving text messages is relatively soundless and the contents of the messages are not readily visible to other than the intended recipients, text messaging is a discrete method of communication that people find useful in a wide variety of contexts.

The MMS protocol is an extension of the SMS protocol and allows a mobile telephone user to send multimedia data in addition to text. A common use of the MMS protocol is to send a picture taken with one camera phone to another mobile telephone.

The Unlicensed Mobile Access (UMA) specification finalized in 2007 allows the combination of mobile cellular phones and wireless IP networks. UMA technology allows a user to access GSM and GPRS mobile services over unlicensed spectrum technologies, including Bluetooth and 802.11.

FIG. 1 shows a commercially-available UMA specification network, the T-Mobile@Home network, which connects a mobile telephone 101 and the T-Mobile website 102. Three routes for connecting to the website 102 are available to the mobile telephone 101: via a wireless router 103 which is connected to the internet 106; via a GSM cellular connection 104 which is located between the mobile telephone and 102; and, via a WiFi connection 105 through a T-Mobile HotSpot router 107 to the internet 106 and then to 102. The handset 101 selects from the three routes on the basis of the relative signal strength of each route.

As shown in FIG. 2, a UMA enabled dual-mode handset 201 connects to both a cellular Radio Access Network (RAN) 202 and an Unlicensed Mobile Access Network (UMAN) 203, and both 202 and 203 connect to the core mobile network 204.

By deploying UMA technology, service providers enable subscribers to roam and, with suitable equipment, to handover mobile telephone calls between cellular networks and public and private unlicensed wireless networks using dual-mode mobile handsets. Such subscribers receive a consistent user experience for their mobile voice and data services as they transition between networks. For example, a user having a residential system such as that shown in FIG. 2 transfers a mobile telephone call carried on the RAN 202 to the UMAN 203 automatically as the mobile telephone comes within the range of the Unlicensed Wireless Network 208, IP Access Network 209 and UMA Network Controller (UNC) 210. Alternately, the Network Controller 210 is a Femtocell Network Controller. The mobile telephone call automatically transfers to the base transceiver stations 205, private network 206, and Base Station Controller (BSC) 207 of the RAN 202 when the mobile telephone leaves the effective range of the UMAN 203.

Cellular telephone service providers, such as AT&T Wireless, allow reception of SMS messages that are sent by email from a computer with internet access.

A system and method are needed which allow a mobile telephone user to send SMS and MMS addressed in native form (i.e. using a telephone number) to non-telephone devices such as personal computers that have IP and MAC addresses.

SUMMARY OF THE INVENTION

A feature of the present invention provides a method that routes communication between at least one mobile telephone and at least one device having an IP address and a Media Access Control (MAC) address, by registering the device on the central router for the service and associating at least one of a telephone number and a user identification with the registered device on the router. For a message directed to the associated telephone number, the method further includes receiving a message on the network router and retrieving the IP address and the MAC address of the device using at least one of the telephone number and the user identification associated with the message as a selection criterion, and routing the message to the IP address and the MAC address of the device, thereby delivering the message from the at least one mobile telephone to the at least one device having the IP address and the MAC address. In this manner a central registry, the network router, enables a full panoply of mobile phone messaging modalities to be directed between a mobile telephone and an arbitrary device, independently of the mobile telephone provider of the device.

In an embodiment of the method the IP address is dynamically allocated. In an alternative embodiment of the method the IP address is statically allocated.

The message in various embodiments is at least one of a Multimedia Message Service (MMS), a Short Message Service (SMS) message, an Instant Messaging format message transmitted using the XMPP protocol, and an Instant Messaging format message transmitted using the SIMPLE protocol.

In various embodiments of the method the type of message is an audio, an image, a video message.

Various embodiments of the method further include delivering the message to at least one device selected from the group consisting of: a television, a cordless DECT telephone, a video game console, a portable video game device, a mobile personal digital assistant an IP enabled messaging appliance, and a personal computer. Further embodiments of the method include delivering the message to a plurality of devices.

In various embodiments of the method the mobile telephone is at least one of an Unlicensed Mobile Access (UMA) capable telephone, an Unlicensed Mobile Access (UMA) capable Personal Data Assistant (PDA) device, a Femtocell capable telephone, a Femtocell capable Personal Data Assistant (PDA) device, a Digital Enhanced Cordless Telephone (DECT) based telephone, and a Digital Enhanced Cordless Telephone (DECT) based device.

In various embodiments the network router is an SMS router or an MMS router. Alternatively, the network router is a Network Address Translation (NAT) wired or wireless router.

A further embodiment of the method includes delivering and receiving the message and displaying the message in an instant messaging session, by transmitting and receiving a plurality of message formats to and from a plurality of devices and displaying sent or received messages in the instant messaging session such that at least one participant messages via a mobile telephone device and at least one participant messages via an internet device The method in a further embodiment includes delivering and receiving the message by a unified messaging server, wherein the unified messaging server sends and receives the message to or from a plurality of devices and a plurality of types of devices and converts the message format to and from at least one format of: SMS, MMS, Instant Message, Common Profile for Instant Messaging (CPIM), APEX, Instant Messaging Exchange Protocol, Presence and Instant Messaging Protocol, Voice Over Internet Protocol, XMPP, and, SIP for Instant Messaging and Presence Leveraging Extensions (SIMPLE).

A feature of the invention provides a system that delivers a message from a mobile telephone to at least one device having an Internet Protocol (IP) and a Media Access Control (MAC) address, the system having a network router including a table for registering and associating at least one of a telephone number and a user identification with the MAC address and the IP address of the at least one device, at least one local area network selected from the group of: a wireless network; a cable network; a DSL network; a telco network; a combination of a DSL and wireless network; a combination of a telco and wireless network; and a combination of a cable and wireless network, for transporting the message from the router to the device; and an internet connection for connecting the local area network to the internet, such that the system delivers the message from the at least one mobile telephone to the at least one device having the IP address and the MAC address associated with at least one of the telephone number and the user identification.

In an embodiment of the system the device is a router (such as a NAT router on the receiving user premises) and the message is delivered to devices connected to the router. Alternatively, the device that receives the message is a television.

In various embodiments of the system the message the message is at least one of: a Multimedia Message Service (MMS) message, a Short Message Service(SMS) message, an Instant Messaging format message transmitted using the XMPP protocol, and an Instant Messaging format message transmitted using the SIMPLE protocol.

The message is an audio message, an image message or a video message in various embodiments of the system.

In various embodiments of the system the mobile telephone is at least one of an Unlicensed Mobile Access (UMA) capable telephone, an Unlicensed Mobile Access (UMA) capable Personal Data Assistant (PDA) device, a Femtocell capable telephone, a Femtocell capable Personal Data Assistant (PDA) device, a Digital Enhanced Cordless Telephone (DECT) based telephone, and a Digital Enhanced Cordless Telephone (DECT) based device.

The network router is for example an SMS router, an MMS router, or a NAT wired router or a NAT wireless router in various embodiments of the system.

An embodiment of the system includes at least one social networking profile which is accessed for a plurality of telephone numbers to which the message is delivered.

The device that receives the message is a television in an embodiment of the system.

A further embodiment of the system includes at least one of an SMS message and an MMS message and the system delivers the message to a plurality of devices.

An embodiment of the system further includes delivering and receiving the message and displaying the message in an instant messaging session, by transmitting and receiving a plurality of message formats to and from a plurality of devices and displaying sent or received messages in the instant messaging session.

A further embodiment of the system includes a unified messaging server delivering and receiving the message, such that the unified messaging server sends and receives the message to and from a plurality of devices and a plurality of types of devices and converts the message format to and from formats such as: SMS, MMS, Instant Message, Common Profile for Instant Messaging (CPIM), APEX, Instant Messaging Exchange Protocol, Presence and Instant Messaging Protocol, Voice Over Internet Protocol, XMPP, and, SIP for Instant Messaging and Presence Leveraging Extensions (SIMPLE).

Figure 1:
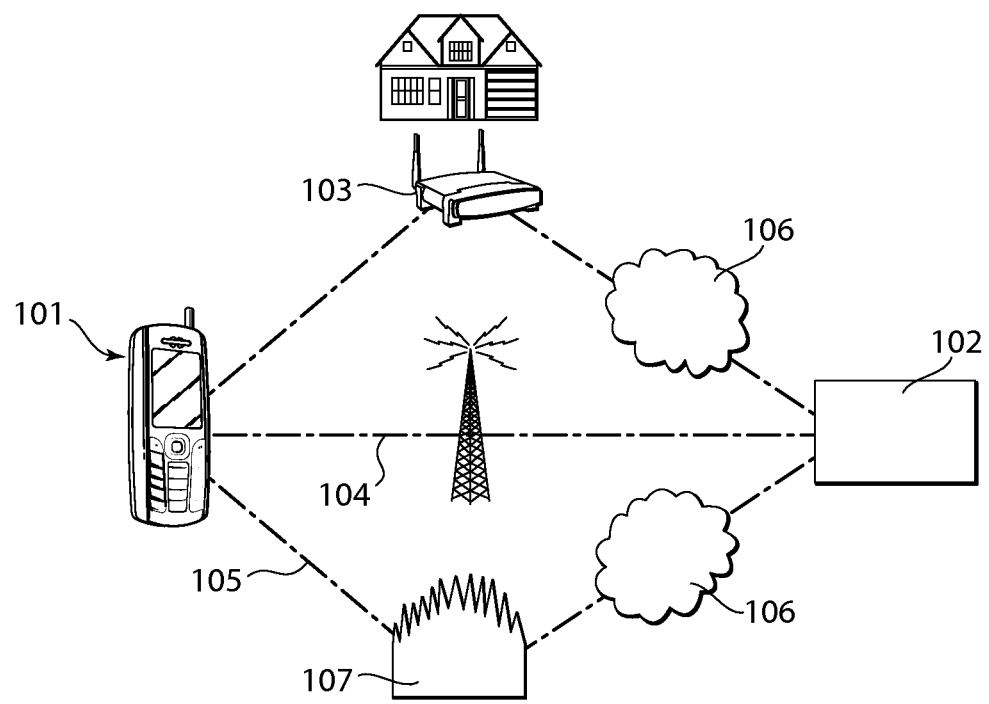
FIG. 1 is a drawing showing a prior-art commercially-available T-Mobile@Home network, having three alternative network paths between a mobile telephone 101 and the T-Mobile website 102. A wireless router 103 is connected to the internet 106, a GSM cellular connection 104 is located between the mobile telephone and 102, and 105 is a WiFi connection through a T-Mobile HotSpot router 107 to the internet 106.
Figure 2:
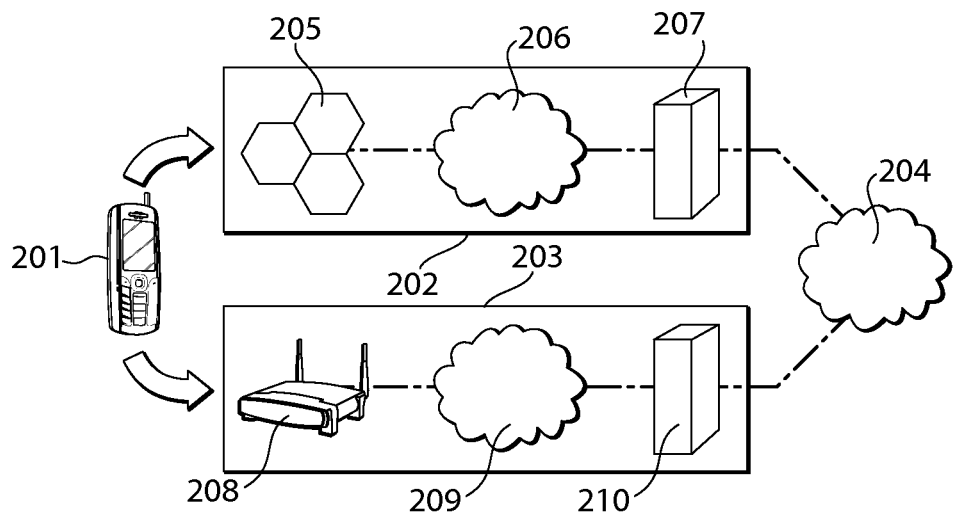
FIG. 2 is a drawing that shows a UMA enabled dual-mode handset 201 and the networks for each of the modes of 201, a cellular Radio Access Network (RAN) 202 and an Unlicensed Mobile Access Network (UMAN) 203. Both 202 and 203 connect to the core mobile network 204. The RAN 202 includes base transceiver stations 205, a private network 206, and a BSC 207. The UMAN 203 includes an Unlicensed Wireless Network 208, an IP Access Network 209 and a UMA Network Controller (UNC) 210.
Figure 3:
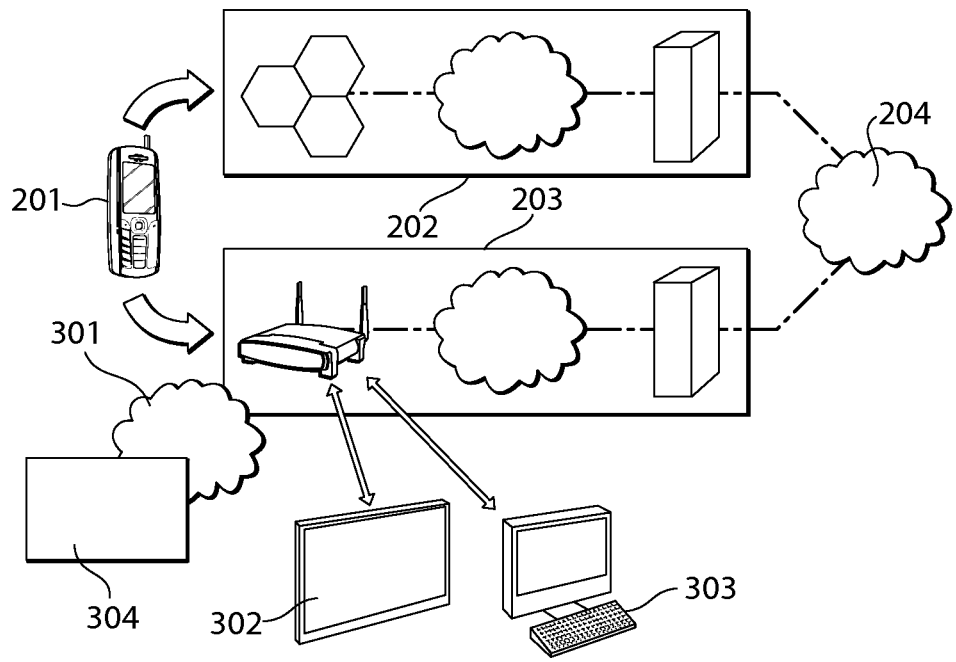

FIG. 3 is a drawing that shows the UMA enabled dual-mode handset 201 and the networks for each of the modes of 201, a RAN 202, UMAN 203, the core mobile network 204 and an SMS/MMS Aggregation layer 301 providing SMS/MMS via IP 304 and terminals 302 and 303 for CID and messaging.

Figure 4:
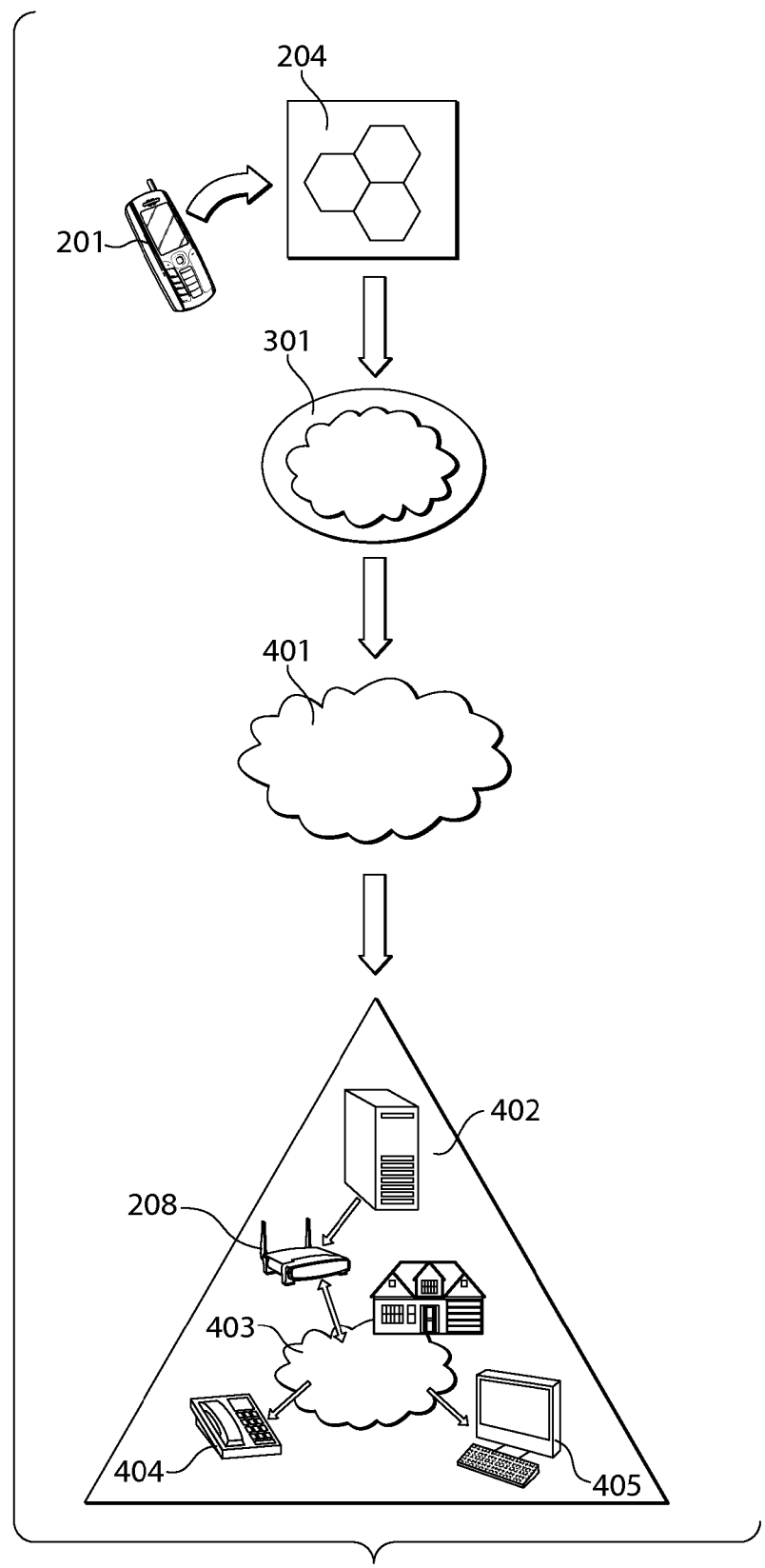

FIG. 4 is a drawing that shows a system and method for receiving text messages from a mobile telephone 201 on a DECT telephone 404 or a Personal Computer 405. The message transmitted from the mobile telephone 201 travels through the cellular provider network 204, to the SMS/MMS Aggregator 301. The SMS/MMS aggregator 301 routes the message to the i5 SMS Router 401. Next, the i5SMS Router 401 routes the message to the i5 Converged Services Platform (CSP) instance 402. Lastly, the i5CSP instance 402 routes the message to the home media server 208 and through the home IP network 403 for display on a DECT telephone 404 or a Personal Computer 405.

Figure 5:
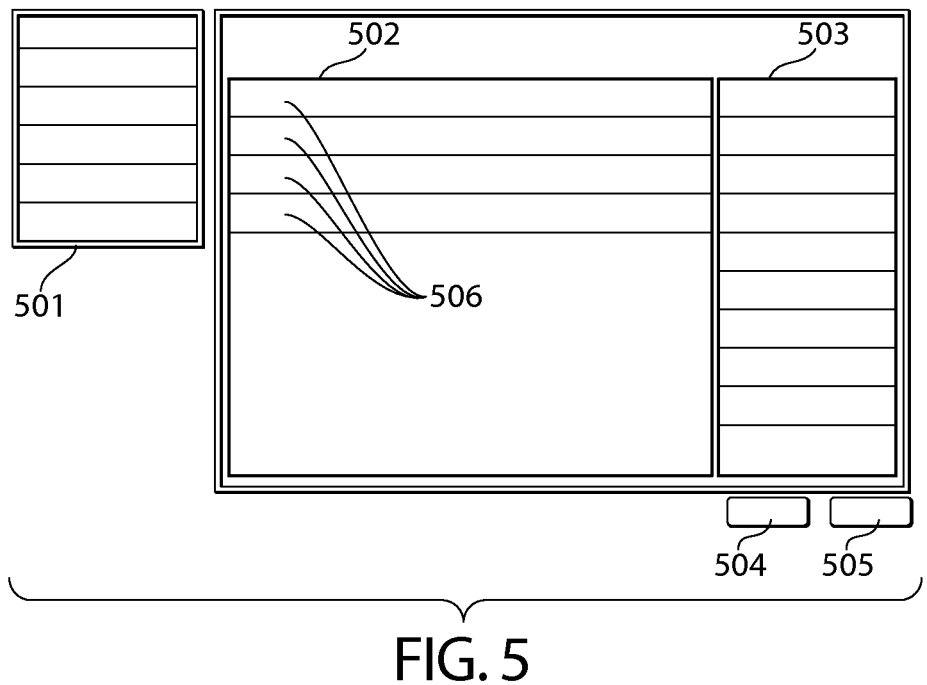

FIG. 5 is a drawing that shows a messaging session screen of an embodiment of the system with a list of menu options 501, a central window 502 displaying messages, a window 503 for listing the chat participants, an "invite" button 504, an "exit" button 505 and text messages 506, listed in 502.

Figure 6:
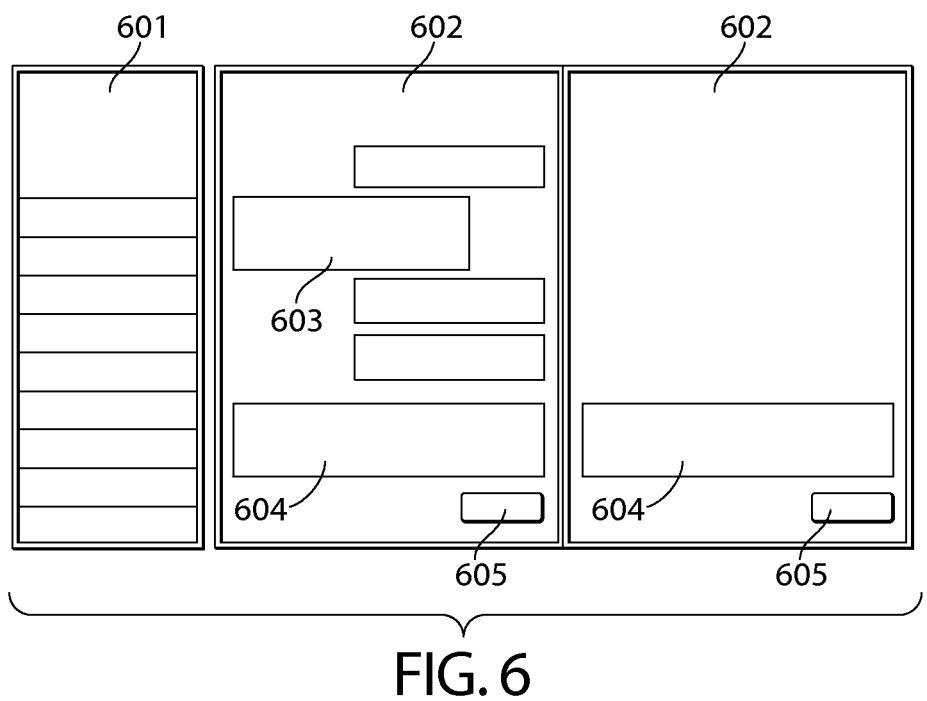

FIG. 6 shows an alternative embodiment of a messaging session screen with a window 601 listing the user's chat friends, two adjacent windows 602 for chat two separate chat sessions containing messages 603, a window for entering new messages 604 and a "send" button 605 for transmitting the message typed into 604.

DETAILED DESCRIPTION OF THE INVENTION

Text messaging is a pervasive and popular use of mobile telephone technology, as is MMS messaging such as sending a digital photograph from one mobile telephone to another mobile telephone. A user who wants to put a photograph that was received on a mobile telephone onto a computer must follow the procedure of connecting the telephone to the computer through a USB port or other means and downloading the photograph to the computer. This is a time consuming and inconvenient process.

An embodiment of the system and method provided herein is a method and system for a user to send a MMS message such as a digital photograph from a mobile telephone 201 to a computer or other device on an IP network. An embodiment of the system provided herein includes a central router 401 as shown in FIG. 4 which takes calls from an intermediary SMS/MMS aggregator 301 as shown in FIG. 3 and FIG. 4 that interconnects mobile carriers and routes the calls to the appropriate location based on telephone number or short code.

In various embodiments of the systems and methods, a user signs up for a service utilizing the method and system, and installation software or a web based application leads the user through a provisioning process which contacts the central router 401 for the service to allocate telephone numbers for the devices on the user's Network Address Translation (NAT) router which the user desires to be available on the service. In accordance with this aspect of the invention a "virtual" or a "device" telephone number is associated with the devices on the user's NAT, and the central router 401 for the service then mediates the delivery of any mobile messaging directed to the virtual or device telephone number. The provisioning process inserts a record to, or updates a record on, a table on the central router 401 for the service. The record contains fields which include the phone number allocated by the provisioning process, the IP address of the device and the MAC address of the device. The provisioning process further registers the telephone numbers with the SMS/MMS aggregator in order that messages for the telephone number will be directed to the central router 401 for the service. The user then gives the virtual telephone number to others with mobile telephones 201 to allow them to send SMS/MMS messages to the device. Alternatively, or in addition, the user adds the number for the device to a profile or contact list associated with a social networking application such as Facebook and allows other user permission view and use the information for sending messages.

In further embodiments of the system and method provided herein the IP address associated with the telephone number allocated by the system router 401 is a virtual IP address that is used by the NAT router to refer to the physical address of the device associated with the telephone number. For example, the NAT router receives the message for the IP address associated with the telephone number. Then the NAT router queries a table for a second IP address the NAT router assigned to the device associated with the IP address. The NAT router then routes the message to the device at the second IP address.

In an alternative embodiment a user signs up for a service utilizing the method and system, and installation software or a web based application leads the user through a provisioning process which contacts the central router 401 for the service to allocate telephone numbers for the devices which the user desires to be available on the service. The device in this embodiment is directly addressed with telephone numbers is associated with the devices, and the central router 401 for the service then mediates the delivery of any mobile messaging directed to the device telephone number. The provisioning process inserts a record to, or updates a record on, a table on the central router 401 for the service. The record contains fields which include the phone number allocated by the provisioning process, the IP address of the device and the MAC address of the device. The provisioning process further registers the telephone numbers with the SMS/MMS aggregator in order that messages for the telephone number will be directed to the central router 401 for the service. The user then gives the virtual telephone number to others with mobile telephones 201 to allow them to send SMS/MMS messages to the device. Alternatively, or in addition, the user adds the number for the device to a profile or contact list associated with a social networking application such as Facebook and allows other user permission view and use the information for sending messages.

In various embodiments of the system herein, the IP addresses of the devices are dynamically allocated and a virtual IP address or device name or user identification with corresponding password is associated on the central router registration table with the device telephone number. Messages addressed to the virtual IP address or device name are resolved to the dynamically allocated IP address at the local router level. In alternative embodiments of the system herein, the IP addresses of the devices are statically allocated and the IP address associated with the telephone number on the central router is the IP address of the device. Further embodiments of the system have devices with dynamically allocated IP addresses and devices with statically allocated IP addresses.

An embodiment of the system provided herein an intelligent service provider SMS/MMS routing system starts with SMS delivery from mobile telephone to television for group chat, grows to provide SMS/MMS delivery from multiple devices to multiple devices and turns one to one and one to many SMS user experiences into true shared group SMS experiences. In various embodiments the system and method provide real-time SMS chat and media (e.g. photos and videos) sharing between mobile telephones, mobile devices, personal computers, game consoles, and DECT telephones. The system is device neutral and the mobile telephones, mobile devices, game consoles, DECT telephones and personal computers can both send and receive SMS and MMS messages. For example, a T-Mobile prior art telephone inter-device interface of the aforesaid T-Mobile@Home system, which is limited to user telephone devices, joined to an Integra5 MediaFriends® Group Chat application running on an embodiment of the system would allow users to send and receive SMS messages between PC and mobile telephone users, PC and PC users, game console and PC, mobile device and PC, DECT telephone and DECT telephone users, and any combination of the preceding users. Users send photographs between mobile telephones and PCs while engaging in real-time SMS chat, or send photographs to Facebook applications with a T-Mobile telephone inter device interface joined with an Integra5 MediaFriends® PhotoSharing application operating with an embodiment of the system. A user sends MMS files from a mobile device to a friend's PC and engages in real-time SMS chat sessions with a T-Mobile and MediaFriends® MMS to PC application by operating an embodiment of the system.

In certain embodiments of the methods and systems provided herein, the user grants the service access to the user's social networking software profiles. For example, the user grants the system permission to open the user's FaceBook® profile and transmit the message to a list of recipient addresses contained in the profile. The user utilizes a MediaFriends® Facebook application using Facebook Connect, then the MediaFriends® Facebook application incorporates the Facebook social media sphere of relationships and allows the system and method to use Facebook's identity, authentication, groups and "follow-me" privacy features. The user thereby further leverages the mobile operator's family plan programs with the MediaFriends® Facebook application.

An exemplary embodiment of the system for receiving text messages on DECT telephones and personal computers as shown in FIG. 4, includes a user typing a text message on a mobile telephone 201 having a hypothetical phone number (789) 624-1342 and sending the message to hypothetical phone number (789)555-1212. The message travels through the cellular provider 204 to the SMS/MMS Aggregator 301. The SMS/MMS aggregator 301 routes (789) 555-1212 to the i5 SMS Router 401. The i5SMS Router 401 routes (789) 555-1212 to the i5CSP instance 402. The i5CSP instance 402 routes (789) 555-1212 to the home media server 208 and through the home IP network 403 for display on a DECT telephone 404 or a Personal Computer 405.

In another exemplary embodiment of the system herein, viz., a multi-device MediaFriends® chat flow, Subscriber A types on a mobile telephone keypad to send an SMS message to Subscriber B, Subscriber C and Subscriber D. The SMS message with telephone number information for each subscriber is transmitted to the mobile telephone network, T-Mobile for example. From the cellular network the messages are routed to an SMS/MMS aggregator. The telephone numbers for the subscribers were previously registered with the aggregator during a provisioning process for setting up each subscriber, and the aggregator routes the messages to an Integra5 SMS router. The telephone numbers with user identification, corresponding password, IP and MAC address information were also registered with the Integra5 central router during the subscriber provisioning process and the central router routes the messages for Subscriber A and Subscriber B to an Integra5 CSP router with a hypothetical telephone number of 781 555-5555 and routes the messages for Subscriber C and Subscriber D to an Integra5 CSP router with a hypothetical telephone number of 212 555-5555. The two Integra5 CSP routers route the messages for Subscriber A, Subscriber B, Subscriber C and Subscriber D to a hypothetical mobile telephone 781-934-4490, a hypothetical DECT telephone 781-685-9932, a hypothetical mobile telephone 212-768-2413 and a hypothetical personal computer D_UserID, respectively.

An embodiment of the method further includes delivering and receiving the message and displaying the message in an instant messaging session, by transmitting and receiving a plurality of message formats to and from a plurality of devices and displaying sent or received messages in the instant messaging session. For example, the method includes a unified messaging server delivering and receiving the message, to and from a plurality of devices and a plurality of types of devices and converting the message format to and from formats such as: SMS, MMS, Instant Message, Common Profile for Instant Messaging (CPIM), APEX, Instant Messaging Exchange Protocol, Presence and Instant Messaging Protocol, Voice Over Internet Protocol, XMPP, and, SIP for Instant Messaging and Presence Leveraging Extensions (SIMPLE).

FIG. 5 shows an embodiment of the system in which a plurality of users engages in an instant messaging session from a plurality of devices and types of devices. A window 501 on the left side of the screen lists menu options for chat activities, i.e. "Find Friends", "Groups", "Invitations", "MediaFriends Chat Settings", and "MyChat" FIG. 5 is a representation of the screen for the menu 501 selection "MyChat". The central window of the screen 502 displays the dialogue of the chat or instant message session as a chronological order listing of message 506 entries. The first part of each entry identifies the participant, for example "John says:" identifies the participant and what John says follows in the message 506 text block. Optionally, the participants can add graphical content to the end of their message entries 506. For example, an entry ends with a smiley face icon. These types of icons are commonly called emoticons. A window on the right side of the screen 503 is for listing the participants in the IM session with an icon to the right of each name indicating the type of device the participant is using. For example, a telephone icon next to John's name indicates that he is participating with a DECT telephone, whereas a computer monitor icon next to Tom's name indicates that he is participating using a personal computer. A television icon is next Alice's name indicates that Alice is participating in the IM session using a television and a mobile telephone icon next to Mike's name indicates that Mike is participating using a cellular telephone.

The IM session shown in FIG. 5 further illustrates the method and system of various embodiments of the invention. For example, if the screen displayed in FIG. 5 is a personal computer screen, then a message 506 sent by Mike using a mobile telephone 201 would travel through a cellular provider network 204, to an SMS/MMS aggregator 301. The SMS/MMS aggregator 301 then routes the message 506 to the i5 SMS router 401. The i5SMS router 401 then routes the message 506 to a unified messaging server which converts the SMS/MMS format text message into an instant messaging format, such as Common Profile for Instant Messaging, appropriate for the instant messaging software installed on the personal computer as shown in FIG. 5. The unified messaging server then sends the message to the personal computer for display in the instant messaging session. A message 506 from the IM session in FIG. 5 to Mike's mobile telephone would take a reverse path, wherein the unified messaging server would convert the message 506 to an SMS/MMS format and then transmit it to the SMS/MMS aggregator 301 for delivery to Mike's mobile telephone.

FIG. 6 shows an embodiment of the system with side by side separate chat sessions. A list of the user's friends 601 is shown at the left of FIG. 6. The user highlights one or more of the friends listed in 601 using a keyboard, mouse or other interface device, and enters the selection to start chat sessions with the selected friends. Chat session windows 602 open in the display and text messages 603 to and from the user display in the chat session window 602 as the user or other users enter messages in the text message entry window 604 and select the "Send" button 605.

The invention now having been fully described, it is exemplified by the following claims. One ordinarily skilled in the art recognizes hardware, software and operating systems to be used to additionally embody the invention. Thus, although the various exemplary embodiments are described above the invention is intended to cover modifications and equivalents within the scope of the description and the claims.

What is claimed is:

1. A computer implemented method for routing message communication between at least one mobile telephone and at least one user device having an IP address and a Media Access Control (MAC) address, the method comprising:
provisioning a virtual telephone number associated with the user device, wherein provisioning includes:
registering the at least one user device on a central router and associating the virtual telephone number with the at least one registered device on the central router; and
registering the virtual telephone number with an SMS/MMS aggregator in order that messages for the virtual telephone number are directed to the central router;
receiving a message from the SMS/MMS aggregator on the central router, the message directed to the virtual telephone number;
retrieving on the central router at least one of the IP address and the MAC address of the at least one registered user device using at least one of the virtual telephone number and a user identification as a selection criterion; and,
routing the message to at least one of the IP address and the MAC address of the at least one registered user device, wherein the message is at least one selected from the group of: a Multimedia Message Service (MMS) message, a Short Message Service (SMS) text message, and an Instant Messaging format message;
wherein the central router is at least one of: an SMS router; and
an MMS router;
thereby delivering the message from the at least one mobile telephone to the at least one at least one registered user device having at least one of the IP address and the MAC address.

2. The method according to claim 1 wherein the IP address is dynamically allocated.

3. The method according to claim 1 wherein the IP address is statically allocated.

4. The method according to claim 1 wherein the message from the SMS/MMS aggregator is transmitted to the central router using one of the XMPP protocol, the SMPP protocol and the SIMPLE protocol.

5. The method according to claim 1 wherein the type of the MMS message is at least one selected from the group consisting of image and video.

6. The method according to claim 1 further comprising delivering the message to at least one selected from the group consisting of: a television, a video game console, a portable video game device, a mobile personal digital assistant, an IP enabled messaging appliance, and a personal computer.

7. The method according to claim 1 further comprising delivering the message to a plurality of devices.

8. The method according to claim 1 wherein the mobile telephone is at least one selected from the group of: an Unlicensed Mobile Access (UMA) capable telephone, an Unlicensed Mobile Access (UMA) capable Personal Data Assistant (PDA) device, a Femtocell capable telephone, a Femtocell capable Personal Data Assistant (PDA) device and.

9. The method according to claim 1 further comprising delivering and receiving the message and displaying the message in an instant messaging session, by transmitting and receiving a plurality of message formats to and from a plurality of devices and displaying sent or received messages in the instant messaging session wherein at least one participant messages via a mobile telephone device and at least one participant messages via an IP enabled Internet device.

10. The method according to claim 1, further comprising delivering and receiving the message by a unified messaging server, wherein the unified messaging server sends and receives the message to and from a plurality of devices and a plurality of types of devices and converts the message format to and from at least one format selected from the group consisting of: SMS, Instant Message, Common Profile for Instant Messaging (CPIM), APEX, Instant Messaging Exchange Protocol, Presence and Instant Messaging Protocol, XMPP, and, SIP for Instant Messaging and Presence Leveraging Extensions (SIMPLE).

11. The method according to claim 1, further comprising associating the virtual phone number with the MAC address.

12. A system for delivering a message from a mobile telephone to at least one device having an Internet Protocol (IP) and a Media Access Control (MAC) address, the system comprising:
a central router comprising a table for registering and associating at least one of a virtual telephone number and a user identification with at least one of the MAC address and the IP address of the at least one device;
at least one local area network selected from the group consisting of:
a wireless network; a cable network; a DSL network; a telco network; a combination of a DSL and wireless network; a combination of a telco and wireless network; and a combination of a cable and wireless network, for transporting the message from the central router to the device;
an internet connection for connecting the local area network to the internet,
wherein the system delivers the message from the at least one mobile telephone via an SMS/MMS aggregator and the central router to the at least one device having at least one of the IP address and the MAC address associated with the virtual telephone number; and
wherein the message is at least one selected from the group of:
a Multimedia Message Service (MMS) message, a Short Message Service (SMS) text message, and an Instant Messaging format message.

13. The system according to claim 12 wherein the device is a router and the message is delivered to devices connected to the router.

14. The system according to claim 12 wherein the message is at least one selected from the group of: an instant Messaging format message transmitted using the XMPP protocol or the SIMPLE protocol.

15. The system according to claim 12 wherein the MMS message comprises at least one selected from the group of: an image message and a video message.

16. The system according to claim 12 wherein the mobile telephone is at least one selected from the group of: an Unlicensed Mobile Access (UMA) capable telephone, an Unlicensed Mobile Access (UMA) capable Personal Data Assistant (PDA) device, a Femtocell capable telephone and a Femtocell capable Personal Data Assistant (PDA) device.

17. The system according to claim 12 wherein the network router is at least one selected from the group of: an SMS router and an MMS router.

18. The system according to claim 12 further comprising at least one social networking profile which is accessed for a plurality of telephone numbers which receive the message.

19. The system according to claim 12 wherein the device that receives the message is a television.

20. The system according to claim 12 wherein the message comprises at least one of an SMS text message and an MMS message, the system further comprising delivering the message to a plurality of devices.

21. The system according to claim 20 further comprising a plurality of devices for delivering and receiving the message wherein the system further comprises a module for implementing a display of messages from different parties in an instant messaging session and wherein the system transmits and receives a plurality of message formats to and from the plurality of devices and displays each sent or received message in the instant messaging session.

22. The system according to claim 12, further comprising a unified messaging server which delivers and receives the message and has logic for sending and receiving the message to and from a plurality of types of devices and a plurality of devices and for converting the message to and from at least two different formats selected from the group consisting of: SMS text message, MMS, Instant Message, Common Profile for Instant Messaging (CPIM), APEX, Instant Messaging Exchange Protocol, Presence and Instant Messaging Protocol, XMPP, and SIP for Instant Messaging and Presence Leveraging Extensions (SIMPLE).

23. The system according to claim 12, further comprising
   a web based application which leads a user of the at least
      one device through a provisioning process to establish
      the virtual telephone number and the user identification.

24. The system according to claim 22, wherein the mobile telephone is an IP enabled mobile telephone sending and receiving SMS text messages via the unified messaging server.

* * * * *